United States Patent Office 3,178,961
Patented Apr. 20, 1965

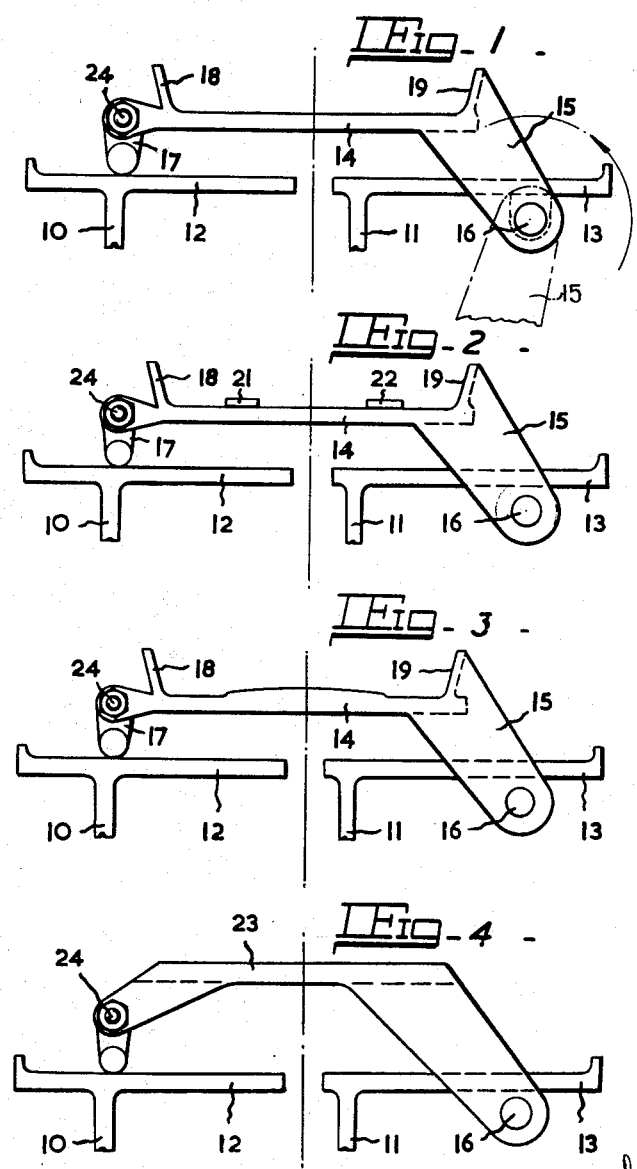

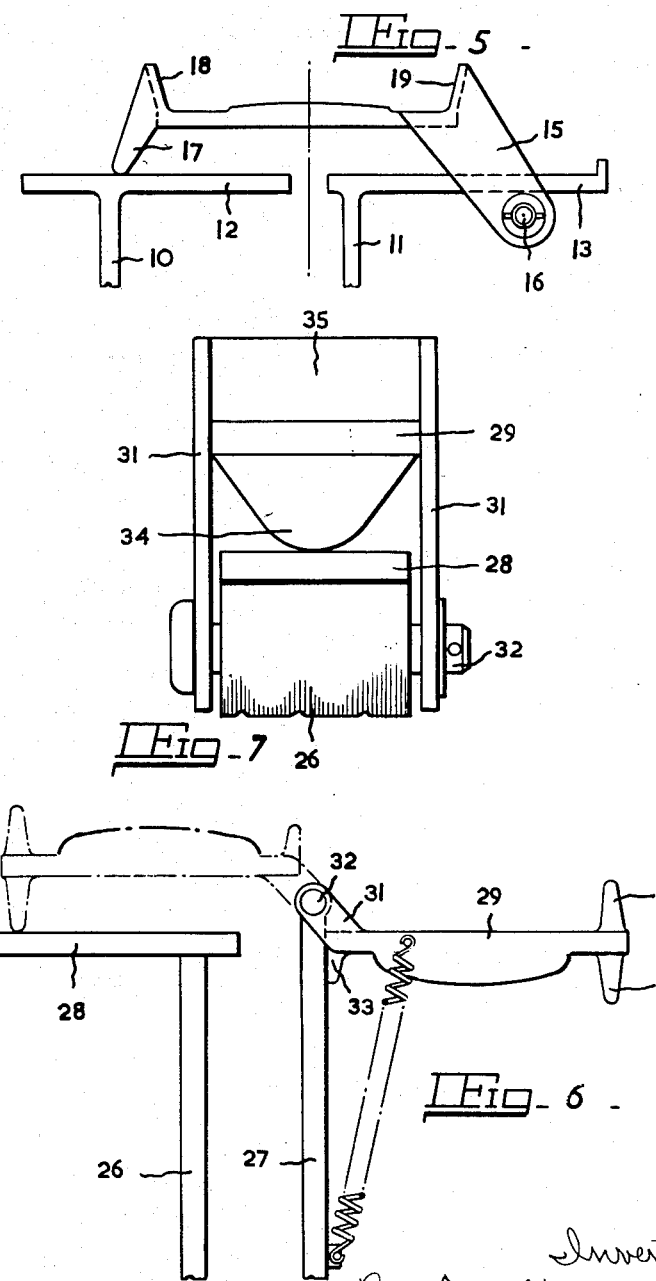

3,178,961
DUAL PEDAL ACTUATING MECHANISM
Peter Camplin Fieldsend, Hollywood, England, assignor to Girling Limited, Birmingham, England, a British company
Filed July 3, 1962, Ser. No. 207,319
Claims priority, application Great Britain, July 8, 1961, 24,809/61; Jan. 9, 1962, 753/62
10 Claims. (Cl. 74—480)

This invention relates to improvements in dual pedal actuating mechanism of the kind employed for actuating brakes of different wheels or sets of wheels on a vehicle.

In braking systems for tractors and like vehicles it is common practice to apply the brakes on the wheels on opposite sides of a vehicle through two pedals mounted side by side and operable independently for differential braking for steering or simultaneously for retarding the movement of the vehicle. For simultaneous operation the pedals are coupled together by a latch, and one of the difficulties with such systems is to obtain effective compensation between the brakes applied by the two pedals when both pedals are actuated simultaneously.

According to our invention, in dual pedal actuating mechanism incorporating two pedals mounted side by side, simultaneous actuation of both pedals is effected through a pad or pressure member pivotally mounted on one pedal and adapted to bear on the second pedal, the arrangement being such that independent movement of the pedals for compensation is permitted.

The pivotally mounted pad or pressure member may be additional to the pads or pressure members by which the brakes are normally applied independently or it may be a member which is pivotally mounted at one end on one of the pedal levers and is movable between two positions in one of which it is rigidly supported by the lever and serves for applying the brake coupled to that lever and in the other of which it extends over a pad or pressure member on the other pedal level with which it engages through a lug or flange projecting from its free end.

Some embodiments of my invention are illustrated diagrammatically by way of example in the accompanying drawings in which:

FIGURES 1 to 5 are elevations of dual pedal assemblies in which a pad or pressure member is pivotally mounted on one pedal and is adapted to bear on the second pedal.

FIGURE 6 is a front elevation of a pedal assembly in which a pivoted pad or pressure member is employed to actuate one or both pedal levers.

FIGURE 7 is an end elevation of the assembly shown in FIGURE 6.

In the arrangement shown in FIGURES 1 to 5, 10 and 11 are parallel pedal levers mounted side by side and adapted to apply brakes on opposite sides of a vehicle. A foot-receiving pad 12 is rigidly mounted on the upper end of the pedal lever 10 and a similar pad 13 is rigidly mounted on the upper end of the lever 11. In the normal off position of the brakes the two pads will be in substantially the same plane as shown in the drawings.

By applying pressure to the pads or pressure member with his right and left feet the driver of the vehicle can apply the brakes independently for steering.

A third pad or pressure member 14 has at one end downwardly inclined lugs 15 which extend downwardly over the sides of the pad 13 and are pivotally connected by a pin 16 to a boss on the underside of the pad. At its other end the pressure member 14 has a downwardly extending lug 17 with a rounded end adapted to engage the upper surface of the pad 12, the length of the lug 17 being such that when it is in engagement with the pad 12 the pressure member 14 is substantially parallel to the pads 12 and 13.

When the brakes are to be applied independently the pressure member is swung around in a clockwise direction about its pivot into an inoperative position in which it extends downwardly from its pivot and lies against the lever 11 below the pad 13. It may be retained in this position by a spring to prevent rattle.

For simultaneous application of the brakes the pressure member is swung up about its pivot into the operative position shown in the drawings in which the lug 17 bears on the pad 12. Foot pressure applied to the pressure member is then transmitted to both pedal levers, but as the pressure member is free to move angularly about its pivot on the pad 13 and to rock about its point of engagement with the pad 12, differential movement of the pedals is permitted and the brakes will be applied with equal force even though this may require a greater movement of one pedal than of the other.

The foot-receiving part of the pressure member 14 may have various forms.

In the arrangement shown in FIGURE 1 it has a flat surface between spaced raised flanges 18, 19 which locate the driver's foot centrally on the member.

In FIGURE 2 the flat surface of the member has two spaced bars 21, 22 to receive the driver's foot.

In FIGURES 3 and 5 the foot-receiving surface of the pressure member between the flanges is convex.

In FIGURE 4 the pressure member has a raised flat surface 23 which may be of a width less than that of the driver's foot so that the driver can centralise his foot by feel.

In some braking systems in tractors and the like actuated by dual pedals the brakes on the driver's side of the vehicle are applied from one pedal either directly or through a short and simple transmission, while the brakes on the other side are applied from the other pedal through a longer or more complicated transmission involving greater frictional losses.

To compensate for this the relative positions of the pivot of the pressure member on the pad 13 and of the point of engagement of the lug 17 with the pad 12 can be selected to ensure that when the brakes are applied through the pressure member the pressure applied to one pedal will be greater than that applied to the other by an amount sufficient to compensate for the different frictional losses in the transmissions to the brakes on opposite sides of the vehicle and so ensure substantially equal braking.

When the mechanism is designed for a specific vehicle the lug 17 may be an integral part of the pressure member as shown in FIGURE 5, the position of the lug relative to the pad 12 having been predetermined according to requirements.

If the exact requirements are not known the lug 17 may be a separate member coupled to the pressure member 14 by a bolt 24 as shown in FIGURES 1 to 4 so that its point of engagement with the pad 12 can be adjusted.

With either arrangement the lug 17 may be fitted with a roller to provide rolling engagement between the lug and the pad 12 and reduce friction.

The pivot 16 about which the pressure member is angularly movable is protected against dirt by its location below the pad.

In the arrangement shown in FIGURES 6 and 7 pedal levers 26 and 27 actuating brakes on opposite sides of a vehicle are parallel and close to each other. A foot-receiving pad 28 is rigidly fixed to the upper end of the lever 26 and extends laterally from it in a direction away from the lever 27.

A movable pad or pressure member 29 has at its inner end adjacent to the fixed pad transversely spaced parallel lugs 31 which extend inwardly and upwardly at an angle of about 45° and are pivotally connected by a pin 32 to the upper end of the lever 27 which projects a short distance above the pad 28.

On the underside of this end of the pressure member 29 there is a downwardly projecting lug 33 which, when the pressure member is in its normal position as shown in full lines in FIGURE 6, bears against the outer side of the lever 27 to support the pressure member in that position.

At the other end of the pressure member there are lugs 34 and 35 projecting upwardly and downwardly from it, the lug 34 helping to locate the driver's foot when the brakes are applied independently with the pressure member in the position shown.

When it is desired to apply both brakes simultaneously the movable pressure member 29 is swung over through 180° about its pivot into the position shown in dotted lines in FIGURE 6 in which it lies above and parallel to the pad 28, the pressure member 29 then being supported at one end by its pivotal connection 32 with its own lever 27 and at the other end by the lug 34 of which the end is rounded and which bears on the pad 28 at a point remote from the lever 26.

The pressure member 29 can thus rock about either end, and when pressure is applied to it the pedal levers 26 and 27 can move differentially to compensate for unequal wear of the friction members of the brakes or unequal frictional resistance in the transmission lines to the brakes.

At the same time the driver, by moving his foot towards one end or the other of the pressure member 29, can apply a greater force to one lever than to the other.

As the levers normally move angularly in the application of the brakes the end of the lug 34 which engages the pad 28 is preferably rounded in two planes as shown in FIGURES 6 and 7.

In an alternative arrangement the lug 34 may have a flat extremity engaging a rounded boss provided on the pad 28.

The pressure member 29 is preferably loaded by a spring such as the spring 36 shown in FIGURE 6 which resiliently retains the pressure member in each of its two operative positions.

Both forms of dual pedal actuation mechanism described above are extremely simple and economical to manufacture and provide effective compensation for differential wear of the brakes applied through the two pedals.

Our improved dual pedal actuating mechanism can also be employed for actuating the brakes on the front and rear wheels of racing cars. In long races a car has to carry a substantial weight of fuel, and if the fuel tank is located at the front or rear of the car the distribution of the wheel loading can change considerably during the race.

I claim:
1. Dual pedal brake actuating mechanism incorporating two pedal levers mounted side-by-side and each having a foot-receiving pad or pressure member on its upper end, in which the pad or pressure member of one pedal lever is pivotally mounted at one end on the one pedal lever and is movable between two operative positions in one of which it is rigidly supported by the lever and in the other of which it extends over the pad or pressure member of the other pedal lever with which it engages through a lug projecting from its free end to permit independent movement of the pedal levers for compensation.

2. Dual pedal brake actuating mechanism as claimed in claim 1 in which the pivotally mounted pressure member in its one operative position has at one end an upwardly extending lug by means of which it is pivoted on the upper end of its pedal lever and a downwardly extending lug adapted to bear against its lever when the member is in its one operative position, and has at the other end a projecting lug adapted to bear on the pad carried by the other pedal lever when the pressure member is in its other operative position.

3. Dual pedal brake operating mechanism as claimed in claim 6 in which the pivotally mounted pressure member is loaded by a spring which is adapted to hold it in each of its two operative positions.

4. Dual pedal brake actuating mechanism incorporating two pedals mounted side-by-side, in which simultaneous actuation of both pedals is effected through a pad or pressure member pivotally mounted on one pedal and adapted to bear on the second pedal, the arrangement being such that when the pressure member bears on the second pedal independent movement of the pedals for compensation is permitted, in which each pedal comprises a foot-receiving pad rigidly mounted on a pedal lever; and the pivotally mounted pressure member is pivoted at one end on the one first pad and has at its other end a lug adapted to make a rocking engagement with the second pad when the pressure member is in its operative position, the pressure member being movable about its pivot into an inoperative position in which it extends downwardly from the first pad and lies against the lever carrying that pad.

5. Dual pedal brake actuating mechanism claimed in claim 4 in which the pivotal connection of the movable pressure member to the first pad is located below the pad.

6. Dual pedal brake actuating mechanism as claimed in claim 4 in which the lug carries a roller for engagement with the second pad.

7. Dual pedal brake actuating mechanism as claimed in claim 4 in which the lug is pivoted on the movable pressure member to permit adjustment of its point of engagement with the second pad.

8. Dual pedal brake actuating mechanism incorporating two pedal members mounted side-by-side, in which a pad or pressure member on one pedal member is pivotally mounted at one end on the one pedal member and is movable between two operative positions, in one of which it is supported by the one pedal member clear of the other pedal member and in the other of which it extends over the other pedal member, and a lug projecting from one of said members which is engageable with the other of said members in said other of said operative positions to permit independent movement of the pedal members for compensation.

9. Dual pedal brake actuating mechanism as claimed in claim 8, wherein each pedal member comprises a pedal lever having a foot-receiving pad on its upper end, and said pressure member is pivotally mounted at one end on the foot-receiving pad on one pedal lever.

10. Dual pedal brake actuating mechanism as claimed in claim 8, wherein each pedal member comprises a pedal lever having a foot receiving pad on its upper end of which the foot-receiving pad on one pedal lever is pivotally mounted on its pedal lever and forms said pivotally mounted pressure member.

References Cited by the Examiner
UNITED STATES PATENTS

| | | | |
|---|---|---|---|
| 421,056 | 2/90 | Sawyer | 74—512 X |
| 1,246,634 | 11/17 | Martino | 74—478 X |
| 2,443,331 | 6/48 | Stewart | 74—480 |
| 2,451,700 | 10/48 | Van Trine | 74—480 |
| 2,504,258 | 4/50 | Elenewiez | 74—478.5 |
| 2,537,697 | 1/51 | Passarotti | 74—478 |
| 2,775,135 | 12/56 | Phillips | 74—478 |
| 2,960,886 | 11/60 | Cunningham | 74—488 |

FOREIGN PATENTS

| | | |
|---|---|---|
| 1,122,544 | 5/56 | France. |
| 1,181,194 | 1/59 | France. |
| 1,267,491 | 6/61 | France. |
| 811,300 | 4/59 | Great Britain. |

BROUGHTON G. DURHAM, *Primary Examiner.*